Patented Feb. 20, 1945

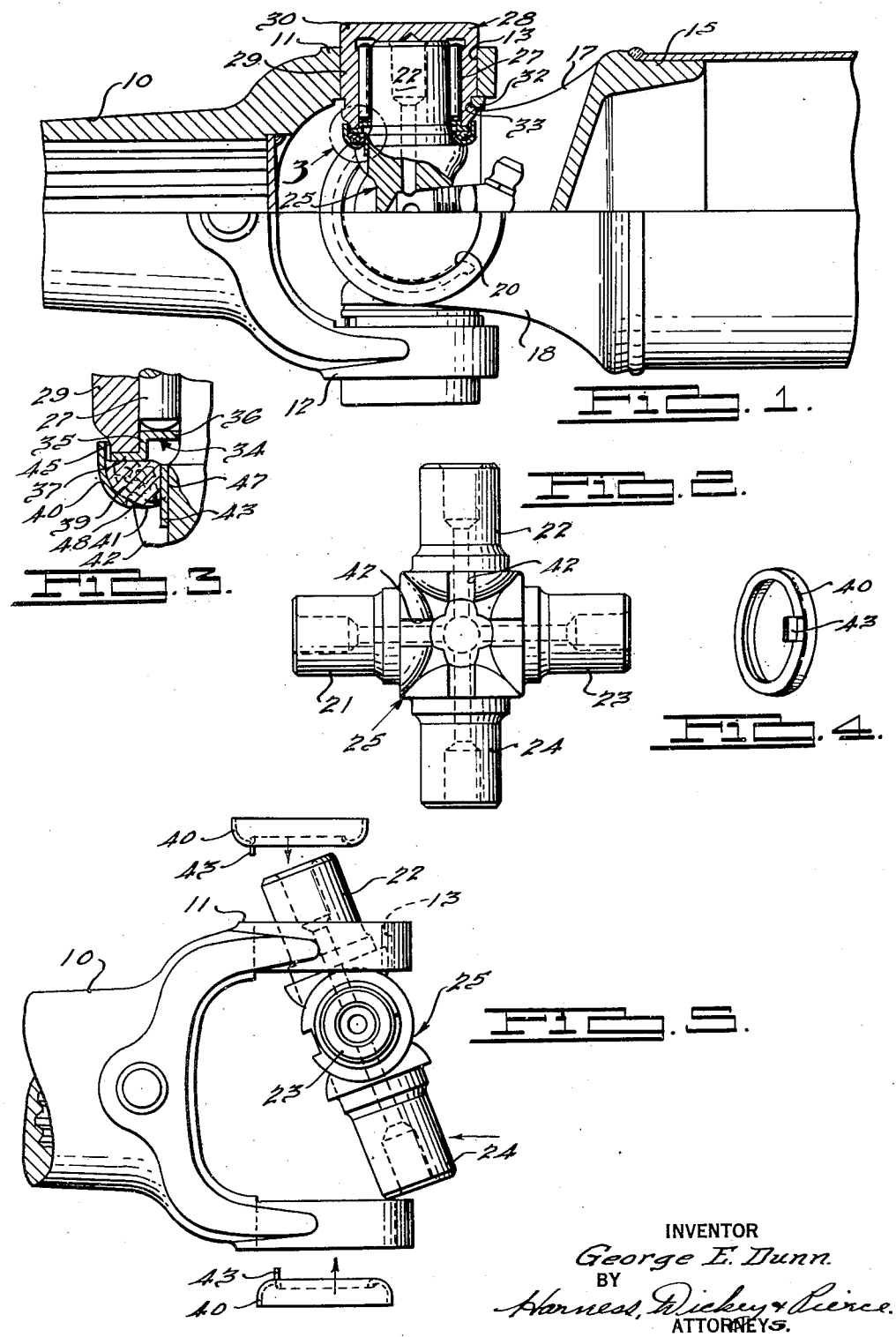

2,370,023

UNITED STATES PATENT OFFICE 2,370,023

UNIVERSAL JOINT

George E. Dunn, Dearborn, Mich., assignor to Universal Products Company Incorporated, Dearborn, Mich., a corporation of Delaware Application April 13, 1942, Serial No. 438,666

4 Claims. (Cl. 64—17)

The invention relates generally to motor vehicles and it has particular relation to improvements in universal joints.

At the present time universal joints of the four trunnion type are widely used in driving shafts for motor vehicles and a conventional design includes a cross cooperating with a pair of yokes. Bearing cups on the yokes respectively receive trunnions on the cross and within the cups small roller bearings are usually provided. The size of such joints normally will depend upon their torque and bearing load capacities and usually a standard form of joint has been designed and then when a larger joint was required to take care of larger loads, the joint was proportionately increased in dimensions.

In connection with the present invention, however, it was discovered that the torque capacity of the yokes, for instance, might be more than sufficient to satisfy a given situation while the bearing capacity would not meet or satisfy the requirements. Hence, where a higher load bearing capacity was required, a larger joint was furnished. By determining, however, that in a case of this kind the torque capacity of the yokes, for instance, was sufficiently large whereas the load bearing capacity was not sufficient to meet the requirements, it became apparent that if the load bearing capacity could be increased without altering the yokes, a smaller than usual joint could be used and fewer changes would be necessary.

In accordance with the foregoing, it is one object of the present invention to increase the load bearing capacity of the joint without appreciably increasing the size of the joint.

Another object of the invention is to provide an improved universal joint of the type stated wherein the load bearing capacity of the joint is materially increased without requiring any change in size of the yokes connecting the trunnions of the cross.

Another and more specific object of the invention is to provide an improved universal joint wherein the trunnions of the cross and bearings thereon may be made longer while still permitting assembly of the cross and yokes through angling and swinging of the cross according to usual practice.

Another object of the invention is to provide improvements in sealing means including an improved ferrule which facilitates assembly of the joint so as to enable obtaining the increased bearing capacity mentioned heretofore.

Other objects of the invention will become apparent from the following specification, from the drawing relating thereto, and from the claims hereinafter set forth.

For a better understanding of the invention, reference may be had to the drawing, wherein:

Figure 1 is an elevational view, partly in cross section, of a universal joint constructed according to one form of the invention;

Fig. 2 is a detail view illustrating the cross of the joint as seen when removed;

Fig. 3 is a detail view on a larger scale showing the sealing means in Fig. 1;

Fig. 4 is a detail view showing the ferrule which retains the sealing ring in position; and Fig. 5 is a view illustrating the manner in which parts of the joint are assembled.

According to Figs. 1 and 2, the joint includes a yoke 10 adapted to be connected to one shaft and having diametrically opposed arms 11 and 12. Each of these arms is apertured as indicated at 13 and the openings are aligned diametrically of the joint axis. A similar hub 15 is adapted to be connected to a second shaft and this hub has yoke arms 17 and 18 which similarly are provided with diametrically aligned apertures 20. The two yokes are disposed with their respective arms in 90° spaced relation and the openings, respectively, receive trunnions 21, 22, 23, 24 of a cross 25. Around each trunnion small roller bearings 27 are provided and these are retained in a cup-shaped bearing member 28 having a side wall 29 in contact with the rollers and an end wall 30 substantially in contact with the end of the trunnion.

The contact or engagement between the bases or end walls of the cups with the ends of the trunnions serves as a means for centering the cross and, in order to properly locate each cup element, a snap locking ring 32 is provided which seats in a groove 33 in the side wall of the cup and engages the inner side of the yoke arm.

As best shown by Fig. 3, an annular retaining ring 34 is provided on the inner end of the side wall of the cup and this element has an angled portion 35 press fitted in the open end of the cup so as to retain it assembled with the cup. The part of the retaining element indicated at 36 retains the rollers 27 and a second part 37 overlies the end face of the cup side wall. This latter part contacts a sealing ring 39 composed of suitable sealing material and this ring is retained in an annular ferrule 40 which is channel shaped in cross section.

The ring 40 is a stamping and is made from sheet metal and the base portion of the ring is curved substantially to fit an enlarged base portion 41 at the inner end of the trunnion. At one point this base portion has a radially extending slot 42 and this slot cooperates with a struck-out tongue 43 on the base of the ferrule so as to prevent relative turning of the ferrule and trunnion. The outer wall of the ferrule overlaps the side wall of the cup and it will be noted that the inner end of such wall is reduced in outside diameter as indicated at 45 so that the outer wall of the ferrule may overlap the cup side wall while still being slightly smaller in diameter as compared to the larger outer diameter of the side wall of the cup. The ferrule is of such dimensions as compared to the opening in the yoke arm and the trunnion, that it may be easily and freely moved through such opening and over the trunnion to its operative position. While the inner leg of the ferrule substantially fits a cylindrical portion 47 at the inner end of the trunnion which is slightly larger than the trunnion diameter, the relation of the inner leg of the ferrule to this cylindrical surface 47 is such that the ferrule may be easily moved to its operative position by manual action. In other words, therefore, the ferrule may be easily moved through the opening in the yoke arm and over the trunnion, and while it will fit rather closely on the surface 47, it may be easily and freely moved over such surface.

From this it should, therefore, be apparent that with the trunnions located in the opening of the yokes, the ferrules containing the sealing rings may be inserted before the cups are in place, by moving the ferrules over the trunnions and through the openings in the yoke arms until they are seated on the enlarged portion 41 at the base of the trunnions. Following this, the bearing cups may be inserted and the snap locking rings applied so as to hold the cups in position. When each cup is applied, the inner end of the side wall thereof presses against the sealing material 39 so as to obtain operative sealing contact and this pressure is such as to force a part of the material, as indicated at 48, into the opening formed in the base of the ferrule as a result of striking out the tongue 43. This material 48 holds the ferrule and sealing ring against relative rotation and, since the ferrule cannot rotate relative to the trunnion, the sealing ring is held against turning even though it is in sealing contact with the cup which does turn relative to the trunnion.

The foregoing relates to mechanical features which cooperate to obtain certain important results now to be set forth. In the first place, by employing a yoke arm having closed openings, it is necessary to assemble opposed trunnions with the yoke through angling of the cross in the manner illustrated in Fig. 5. It was found that with the ferrules in place, the trunnions could not be made longer while still permitting their assembly with the same yoke, as the ferrules would interfere. Not only would the ferrule on the trunnion first inserted interfere through its engagement with the side walls of the opening in the yoke arm, but also the ferrules on the trunnions disposed at right angles to such first trunnion would interfere, since these ferrules would engage the inner side of the yoke arm at opposite sides of the opening therein. Thus, for instance, in inserting the cross to the position shown in Fig. 5, so that one trunnion would project at an angle to the opening in the yoke arm, three ferrules would interfere with the assembling operation.

The present invention provides a simple expedient of employing ferrules which can be inserted after assembly and then using longer trunnions and bearing cups. With the ferrules omitted, the cross having longer trunnions can be assembled with the yoke arms and then the ferrules and bearing cups can be easily applied since the ferrules can be freely and easily moved into position from the outer ends of the trunnions and the bearing cups can be applied in the usual manner. The structure is of such character that the cross cannot be assembled with the yoke arms with the ferrules in position, or, in other words, the size of the openings in the yoke arm, the size of the ferrules and the length of the trunnions are such that the assembly cannot be made if the ferrules are first in place. Repair men, such as those in garages or the like, can easily apply the ferrules after the cross is assembled with the yoke arms and unless the ferrules are properly in place, the cup and retaining snap rings cannot be assembled in proper positions. It follows finally that the parts can be assembled only in one manner and there is no danger of inexperienced persons making an improper assembly.

It may be stated further that the improvement enables using standard yoke arms that have been used where smaller bearing capacities have been obtained and the only change required is to use a cross ferrules and bearings cups such as shown. As will be seen from the drawing, the longer trunnions actually project beyond the outer side of such yoke arms and the bases of the bearing cups are actually disposed beyond the outer side of the arms. The axial center of each bearing, that is, longitudinally of the trunnion, is therefore shifted in a direction toward the outer end of the trunnion and it becomes located near to the axial center of the opening in the yoke arm. By having the axial center of the bearing nearer to the axial center of the yoke arm opening, torque loads are better distributed on the yoke arms and furthermore the yoke possibly may take greater torque loads since the loads are better balanced.

As a generality, therefore, it may be said that the joint will have substantially greater bearing capacity and where use of universal joints depends upon bearing capacity, the present invention enables using a smaller size joint for transmitting greater torque loads. Smaller joints, therefore, may be used in places where now larger joints are required. Besides this, the yoke arms can be used with regular crosses having shorter trunnions provided with ferrules initially press fitted into position and the present improvement, therefore, permits using the yoke arms either with a standard cross having shorter trunnions and press fitted ferrules, or a cross having longer trunnions and ferrules such as disclosed herein.

Although only one form of the invention has been illustrated and described in detail, it will be apparent to those skilled in the art that various modifications may be made without departing from the scope of the appended claims.

What is claimed is:

1. A universal joint comprising a cross having opposed pairs of trunnions each trunnion having an enlarged base at its inner end, a pair of yokes each having yoke arms provided with aligned openings receiving a pair of trunnions, a cup fitting each opening and receiving the trunnion, sealing means around each of the four trunnions at the inner end of the cup and including an annular ferrule seated on the enlarged base and which is insertable freely through the yoke opening and over the trunnion, and means on the ferrule and trunnion for locking them against relative turning and being of such character as to become engaged when the ferrule is moved over the trunnion and is turned into a predetermined circumferential relation to the trunnion, the diameter of the yoke openings in the arms of one yoke and distance between the inner faces of such arms, the distance between the outer end faces of the pair of trunnions for said yoke, the diameters and length of such trunnions, the diameter of the enlarged bases on both pairs of trunnions, and the diameter of the ferrules being so related that assembly of said one yoke with its trunnions through initial insertion of one trunion into one yoke opening from the inner end of the opening and then swinging of the cross to align the opposed trunnion with the other opening in the yoke, cannot be effected if the ferrules are first placed on the other pair of trunnions.

2. A universal joint comprising a cross having opposed pairs of trunnions each trunnion having an enlarged base at its inner end, a pair of yokes each having yoke arms provided with aligned openings receiving a pair of trunnions, a cup fitting each opening and receiving the trunnion, sealing means around each of the four trunnions at the inner end of the cup and including an annular ferrule seated on the enlarged base and which is insertable freely through the yoke opening and over the trunnion, and means on the ferrule and trunnion for locking them against relative turning and being of such character as to become engaged when the ferrule is moved over the trunnion and is turned into a predetermined circumferential relation to the trunnion.

3. A universal joint comprising a cross having opposed pairs of trunnions each trunnion having an enlarged base at its inner end, a pair of yokes each having yoke arms provided with aligned openings receiving a pair of trunnions, a cup fitting each opening and receiving the trunnion, sealing means around each of the four trunnions at the inner end of the cup and including an annular ferrule seated on the enlarged base and which is insertable freely through the yoke opening and loosely over the trunnion, and interlocking means on the ferrule and trunnion for locking them against relative turning and being of such character as to become engaged when the ferrule is moved over the trunnion, the diameter of the yoke openings in the arms of one yoke and distance between the inner faces of such arms, the distance between the outer end faces of the pair of trunnions for said yoke, the diameters and length of such trunnions, the diameter of the enlarged bases on both pairs of trunnions, and the diameter of the ferrules being so related that assembly of said one yoke with its trunnions through initial insertion of one trunnion into one yoke opening from the inner end of the opening and then swinging of the cross to align the opposed trunnion with the other opening in the yoke, cannot be effected if the ferrules are first placed on the other pair of trunnions.

4. A universal joint comprising a cross having opposed pairs of trunnions each trunnion having an enlarged base at its inner end, a pair of yokes each having yoke arms provided with aligned openings receiving a pair of trunnions, a cup fitting each opening and receiving the trunnion, sealing means around each of the four trunnions at the inner end of the cup and including an annular ferrule seated on the enlarged base and which is insertable freely through the yoke opening and loosely over the trunnion, and key means on the ferrule and trunnion for locking them against relative turning when the ferrule is moved over the trunnion, the diameter of the yoke openings in the arms of one yoke and distance between the inner faces of such arms, the distance between the outer end faces of the pair of trunnions for said yoke, the diameters and length of such trunnions, the diameter of the enlarger bases on both pairs of trunnions, and the diameter of the ferrules being so related that assembly of said one yoke with its trunnions through initial insertion of one trunnion into one yoke opening from the inner end of the opening and then swinging of the cross to align the opposed trunnion with the other opening in the yoke, cannot be effected if the ferrules are first placed on the other pair of trunnions.

GEORGE E. DUNN.